United States Patent
Suwama et al.

(10) Patent No.: US 7,425,018 B2
(45) Date of Patent: Sep. 16, 2008

(54) VEHICLE INTERIOR PANEL AND PRODUCTION PROCESS

(75) Inventors: Takahiro Suwama, Shizuoka (JP); Shuji Yamada, Shizuoka (JP)

(73) Assignee: Nihon Plast Co., Ltd., Shizuoka (JP)

( * ) Notice: Subject to any disclaimer, the term of this patent is extended or adjusted under 35 U.S.C. 154(b) by 351 days.

(21) Appl. No.: 10/953,565

(22) Filed: Sep. 30, 2004

(65) Prior Publication Data

US 2005/0104346 A1   May 19, 2005

(30) Foreign Application Priority Data

Sep. 30, 2003  (JP)  ............................. 2003-340397
Sep. 30, 2003  (JP)  ............................. 2003-340398
Sep. 30, 2003  (JP)  ............................. 2003-340994

(51) Int. Cl.
*B60R 21/16*  (2006.01)
*B60R 21/205*  (2006.01)

(52) U.S. Cl. .................................... 280/728.3; 280/732

(58) Field of Classification Search ............. 280/728.3, 280/731, 732
See application file for complete search history.

(56) References Cited

U.S. PATENT DOCUMENTS

| | | | | |
|---|---|---|---|---|
| 4,852,907 A | * | 8/1989 | Shiraki et al. ................ 280/731 |
| 5,002,307 A | * | 3/1991 | Heidorn ...................... 280/731 |
| 5,082,310 A | * | 1/1992 | Bauer ........................ 280/732 |
| 5,172,931 A | * | 12/1992 | Baba et al. ................ 280/728.3 |
| 5,375,876 A | * | 12/1994 | Bauer et al. ............... 280/728.3 |
| 5,447,327 A | * | 9/1995 | Jarboe et al. .............. 280/728.3 |
| 5,487,558 A | * | 1/1996 | Ball et al. ................. 280/728.3 |
| 5,533,749 A | * | 7/1996 | Leonard et al. ........... 280/728.3 |
| 5,611,564 A | * | 3/1997 | Bauer ...................... 280/728.3 |
| 5,698,283 A | * | 12/1997 | Yamasaki et al. ............ 428/43 |
| 5,738,367 A | | 4/1998 | Zichichi et al. |
| 5,779,262 A | * | 7/1998 | Totani et al. ............. 280/728.3 |
| 5,871,229 A | | 2/1999 | Saito |
| 5,989,479 A | * | 11/1999 | Yamasaki et al. ........... 264/510 |
| 6,065,771 A | * | 5/2000 | Kawakubo et al. ........ 280/728.3 |
| 6,106,003 A | * | 8/2000 | Rahmstorf et al. ........ 280/728.3 |
| 6,113,131 A | * | 9/2000 | Uehara et al. ............ 280/728.3 |
| 6,460,875 B1 | * | 10/2002 | Teranishi et al. ......... 280/728.3 |
| 6,651,998 B1 | * | 11/2003 | Mayer et al. ............. 280/728.3 |
| 6,716,519 B2 | * | 4/2004 | Ueno et al. .............. 428/308.4 |
| 6,726,239 B1 | * | 4/2004 | Teranishi et al. ......... 280/728.3 |
| 7,156,415 B2 | * | 1/2007 | Gray et al. .............. 280/728.3 |
| 7,275,759 B2 | * | 10/2007 | Sawada ................... 280/728.3 |
| 2002/0024199 A1 | * | 2/2002 | Helfrich et al. .......... 280/728.3 |

(Continued)

FOREIGN PATENT DOCUMENTS

EP         0 639 481 A        2/1995

(Continued)

*Primary Examiner*—Christopher Ellis
*Assistant Examiner*—Joseph Rocca
(74) *Attorney, Agent, or Firm*—Sughrue Mion, PLLC

(57) ABSTRACT

An interior panel for covering an air bag module of a vehicle, includes a base layer of hard resin, formed with a breakaway portion to form a deployment door for the air bag module; and a covering layer overlying the base layer, and including a surface layer of soft resin forming an interior surface. The covering layer includes a break guide portion formed between the base layer and the surface layer.

10 Claims, 6 Drawing Sheets

U.S. PATENT DOCUMENTS

2002/0042235 A1 * 4/2002 Ueno et al. ................. 442/227

FOREIGN PATENT DOCUMENTS

| | | |
|---|---|---|
| EP | 0 970 856 A | 1/2000 |
| JP | 9-11246 A | 1/1997 |
| JP | 11-291069 A | 10/1999 |
| JP | 2000-16216 A | 1/2000 |
| JP | 2000-512953 A | 10/2000 |
| JP | 2002-234413 A | 8/2002 |
| JP | 2003-146171 A | 5/2003 |
| WO | WO 98/57790 A | 12/1998 |

* cited by examiner

FIG.5
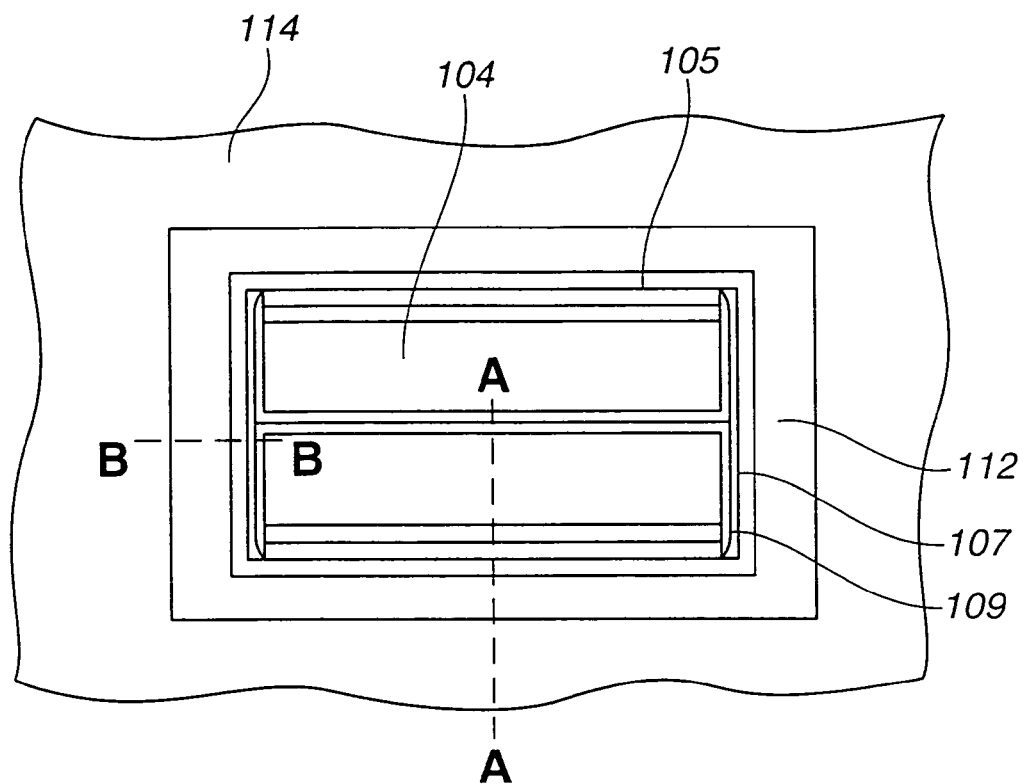
FIG.6A        FIG.6B
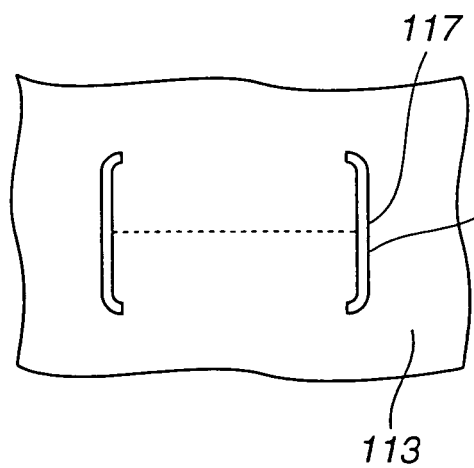 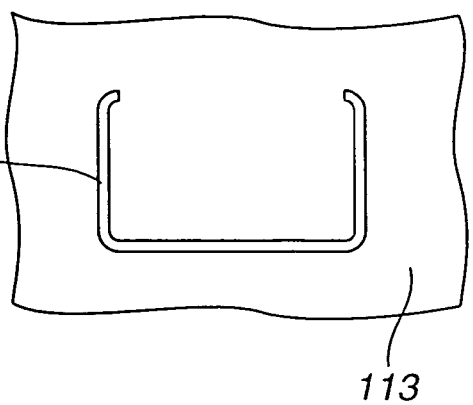

VEHICLE INTERIOR PANEL AND PRODUCTION PROCESS

BACKGROUND OF THE INVENTION

The present invention relates to an internal mounting panel for an automobile for covering an air bag device, and its manufacturing method.

When the automobile receives an impact, the air bag device senses its impact, and expands and develops an air bag and interposes the air bag between an automobile body and a crew member so that the air bag device protects the crew member.

The air bag device is rapidly spread in recent years, and its arranging place is not only a steering wheel for the driver's seat and an instrument panel for the passengers's seat, but the air bag for a side portion for protecting the occupant from the impact of the side face portion is also arranged in the upper portion of an automobile body side window.

For example, in the air bag device for the passenger's seat arranged within the instrument panel, an air bag cover body as the internal mounting panel for covering this air bag device is prepared as a separate object different from the instrument panel. This air bag cover body is usually assembled into an opening portion arranged in the instrument panel. However, in recent years, these members are integrated and formed as a module so that manufacturing and assembly works are rationalized. Further, it is required to improve the external appearance of the instrument panel as an internal mounting part by removing a joint.

Thus, a member obtained by integrating the air bag cover body with the instrument panel is already proposed. For example, the member described in JP-A-11-291069 is known. In this laid-open patent, the instrument panel having no opening portion for the air bag is injection-molded, and laser processing is performed in a portion corresponding to an air bag storing position on this panel rear face so that a breaking prearranging line is formed.

However, in this method for post-processing the breaking prearranging line, a laser processor for this processing is required and a slight processing work is required after the molding, etc. Accordingly, there are problems in view of cost and productivity.

Further, the molding method for forming the breaking prearranging line for developing the air bag cover body in the molding process which requires no post-processing is also proposed in JP-A-2002-234413.

Another molding method is also proposed in JP-A-2003-146171. In this method, when the breaking prearranging line is processed in a hard in-panel constructed by a hard material at the molding time, a block having needle-shaped pins is advanced and retreated within a cavity in this processing. Further, the appearance of the breaking prearranging line on the surface of a block pressing trace is prevented by raising the temperature of a die surface of the opposite side than the block temperature of a breaking prearranging line processing face.

This method is a rational method since no post-processing is required. However, it is necessary to arrange a core and the block for forming the breaking prearranging line within the molding die so as to be freely advanced and retreated. Further, the die becomes complicated and the molding method also becomes complex.

Further, since the instrument panel is an internal mounting part, its external appearance and feel are also important. Therefore, there have been proposed various types of two-layer structure in which a surface layer of this panel is constructed by a soft material having a soft feeling, which is laminated on a base material layer.

However, when such a two-layer structure is set, it is technically difficult to stably obtain predetermined breaking characteristics. Namely, the present inventors have known that a technical means for stably generating the breaking of a skin layer toward just above a groove portion arranged in the base material layer is required from various trial results based on teaching of the above prior art.

It is presumed that this is because the air bag cover is not necessarily uniformly pushed up from the downward air bag, and the breaking is easily caused in the direction inclined with respect to the just above direction by applying shearing force due to uneven rising. For example, in the cover of a single flap type (open side type), there is a relation in which the air bag cover is un-uniformly pushed up in the relation of a door forming portion and its peripheral edge. In the cover of a twin flap type (double hinged type), there is a relation in which the air bag cover is further un-uniformly pushed up in the relation of flaps adjacent to each other. This breaking angle can be set to a direction similar to the just above direction in a certain place, and is inclined in a certain case. The inclination angle at that time does not easily become constant. Therefore, the selection of a material for obtaining predetermined desirable breaking characteristics, the specification of a molding processing condition to stably utilize physical properties of this specified material, and strict quality management are required. Therefore, there is a fear that cost is greatly increased.

In the air bag cover of such a structure of plural layers, there is also a proposal for reliably breaking the breaking prearranging line by smaller force. In JP-T-2000-512953, the construction of a two-layer air bag cover body is proposed. In this construction, the two-layer air bag cover body is constructed such that the cover body can be broken by smaller force without continuously breaking the cover body over the end portion of an intended breaking line, and opening force and breaking force are changed without changing visual and/or mechanical characteristics in the cover body of the air bag having a cover layer of a smooth surface.

In accordance with such a construction, the breaking line is formed at the edge between portions in which the surface layer and the base material layer are extended into their mutual layers in the groove portion of the base material layer.

In accordance with such a construction, the breaking is caused on the contact face of two layers adjacent to each other. Accordingly, it is considered that the breaking can be more reliably generated as designed along the breaking prearranging line.

There is an internal mounting part having a skin arranged through foaming polyurethane in the base material layer of polypropylene as a technique of the internal mounting part not considering formation of an air bag deployment door. However, since an adhering property is inferior in polypropylene and polyurethane, the internal mounting part is manufactured by a method for molding the polyurethane surface layer by insert molding after the base material layer surface of polypropylene is coated with a primer.

This molding method is inferior in working property and also has disadvantage in cost since the primer is used.

There is also another proposal with respect to this problem. For example, JP-A-9-11246 discloses a method in which preprocessing for forming an irregular coarse face by a water jet with respect to the surface of the polypropylene base material layer is performed instead of the primer processing, and the polypropylene base material layer is then arranged in a die and the polyurethane molding material is filled between the die and the skin and is foamed and molded. In accordance with this method, adhesive force is improved by an anchor effect using the coarse face formation processing.

However, the internal mounting panel able to be adapted for the development of the air bag must be reliably broken at a breaking prearranging position during the operating time of the air bag device, and the air bag must be smoothly developed. In the construction of the normal instrument panel in which there is no breaking prearranging portion in the skin and the polyurethane layer as in the above method, it is difficult to set the internal mounting panel reliably broken in the predetermined position even when this instrument panel is applied to the air bag cover as it is. Therefore, it is necessary to take a structural countermeasure to reliably cause the breaking in the predetermined position. Namely, a weak portion is formed in the base material layer after the molding. Further, in a position corresponding to this weak portion, a weak portion is also formed in the surface layer constructed by the polyurethane layer and the skin. Therefore, processes are further added so that productivity is reduced.

Further, it is technically difficult to stably obtain predetermined breaking characteristics even when a two-layer structure of the polyurethane surface layer and the base material layer including no skin is set.

No layer separation using impact force at the above internal mounting panel breaking time can be sufficiently avoided by adhesive force using the coating of the conventional primer and the coarse face formation processing using the water jet. Therefore, no stable opening-tearing behavior at the air bag developing time can be obtained.

JP-A-2000-16216 proposes various structures in which the surface layer of this panel is constructed by a soft material having a soft feeling and is laminated on the base material layer. Further, in another proposed method, this surface layer is set to a skin constructed by a skin layer, a foaming layer and a barrier layer and is inserted and the base material layer is insert-molded.

This breaking prearranging portion is constructed by a cut-removing portion extended from the surface side of the base material layer to the barrier layer of the skin, and a small hole able to break the skin layer is formed in a corresponding portion of the skin layer.

As mentioned above, the internal mounting panel as the air bag cover body is an internal mounting part of the automobile, and its external appearance and feel are also important.

When a contact face for mutually extending the above surface layer and the base material layer is set to the breaking line, a thin wall portion is also formed on the surface layer side. However, as a result, since the thin wall portion is further arranged in the surface layer originally having a small thickness, it also has a visual influence on the surface side of this thin wall portion and the breaking prearranging line is visually recognized. Further, when a vehicle occupant comes in contact with the contact face with a hand and fingers, its touch is different from the circumferential touch. Therefore, a problem is caused in the outward appearance and the feel.

Further, since the thin wall portion is further arranged in the surface layer having a soft feeling and set to be originally thin on the base material layer having a groove, the thin wall portion is easily broken at the operating time of the air bag. On the other hand, there is also a fear that this thin wall portion is mechanically weak and can be damaged at the normal time.

Further, at the operating time of the air bag device, the internal mounting panel must be reliably broken in the breaking prearranging position, and the air bag must be smoothly developed. In the construction of the normal instrument panel in which there is no breaking prearranging portion in the skin and the polyurethane layer as in the above method, it is difficult to set the internal mounting panel reliably broken in the predetermined position even when this construction is applied to the internal mounting panel as it is. Therefore, it is necessary to take a structural countermeasure to reliably break the internal mounting panel in the predetermined position. Namely, it is necessary to form the weak portion in the base material layer after the molding, and also form another weak portion in the surface layer constructed by the polyurethane layer and the skin in the position corresponding to this weak portion. Therefore, processes are further added and productivity is reduced.

Further, it is technically difficult to stably obtain predetermined breaking characteristics even when the two-layer structure of the polyurethane surface layer and the base material layer including no skin is set.

In the air bag cover having the skin having a cushion layer, small hole processing is also required as mentioned above on the skin side in a breaking prearranging portion corresponding position after the skin molding so as to smooth this breaking. Therefore, there is a problem in productivity. Further, although it is the small hole, there is a problem in the external appearance since the hole exists in the skin.

SUMMARY OF THE INVENTION

An object of the present invention is to provide an internal mounting or interior panel for a vehicle which is suitable for the integration of an instrument panel having a soft decorative surface layer arranged on the base material layer, and can be reliably broken along the breaking prearranging or breakaway line at the operating time of the air bag device, and has high reliability as a safe device, and is not different from the circumferential portion in the surface external appearance at the normal time, and is integrated visually in the feel.

Another object of the present invention is to provide an internal mounting or interior panel suitable for the integration of the instrument panel able to be simply molded without requiring processing after the molding and a complicated die and a molding method for the molding.

Still another object of the present invention is to provide an internal mounting panel for a vehicle which covers the air bag device and has a cushion layer and a surface layer or skin having a soft feeling and requiring no hole processing and is excellent in both the feel and the external appearance, and can be reliably broken along the breaking prearranging line at the operating time of the air bag device, and has high reliability as a safe device.

The present invention has been made by knowing that it is effective to interpose breaking inducing means or break guide portion in the boundary portion of the surface layer and the base material layer in the internal mounting panel suitable for the integration of the instrument panel of a structure in which the surface layer manufactured by soft resin is arranged on the base material layer manufactured by hard resin.

The present invention resides in an internal mounting panel for a vehicle including a panel portion in which the panel portion is to cover an air bag device or module assembling a stored air bag, in its air bag expanding-out direction and a breaking prearranging or breakaway portion forming a deployment door portion by developing the air bag is formed.

This panel portion has a base material layer or base layer to be disposed on the air bag device's side and made of hard resin, and a surface layer formed on the base material layer and made of soft resin. There is a break guide portion serving as break inducing means, between the base material layer and the surface layer.

This breaking prearranging portion can be set to include a groove having a bottom and arranged on the side of the base material layer opposed to the air bag device, and the breaking inducing means can be set to include a rising or raised portion formed in the surface layer along the wall portion of the groove. The rising portion may be formed on both the left and right sides of the groove portion.

The breaking inducing means may include an adhesive and the base material layer and the surface layer in the breaking prearranging portion are adhered to each other with adhesive strength sufficient to maintain a laminating state at the breaking time of an air bag cover. The tensile strength of the surface layer may be 70 kgf/cm or less, and is smaller than the adhesive strength of the base material layer and the surface layer.

The breaking prearranging portion may be constructed by a weak or weakened portion arranged on the side of the base material layer opposed to the air bag device, and the base material layer and the surface layer are adhered to each other with the adhesive strength of a surface layer side part of the base material layer corresponding to the weak portion greater than the adhesive strengths of other parts. The adhesive layer can be set to an adhesive layer bonded to the surface layer by urethane bonding and arranged between the base material layer and the surface layer. The surface layer can be constructed by polyurethane formed by reaction injection molding, and the base material layer can be constructed by a polyolefin material.

The breaking inducing means or break guide portion may include a cushion layer laminated between the base material layer and the skin or surface layer manufactured by soft polyurethane resin. The breaking prearranging portion may be constructed by a weak or weakened portion formed to be opened in a continuous groove shape in the base material layer side so as to confront the air bag device. A discontinuous concave portion may be continuously arranged in a cushion layer side part of the skin corresponding to the weak portion, and the cushion layer is extended to the concave portion.

The internal mounting or interior panel may include a cushion layer laminated between the base material layer and the surface layer or skin manufactured by soft polyurethane resin. The breaking prearranging portion may be constructed by a weak portion having a bent portion formed to be opened in the base material layer side so as to confront the air bag device. The breaking inducing means may includes a discontinuous concave portion or depressed portion continuously formed in the surface layer on the cushion layer's side of the surface layer or skin, at a position corresponding to the weak portion. A convex or projected portion may be formed in the region in which the discontinuous concave or depressed portion is formed, specifically at the position corresponding to the outside of a bending point of the bent portion, and the cushion layer is extended in the concave portion. A hole formed in a groove shape can be selected as the discontinuous concave portion of said surface layer in said bent portion.

The internal mounting panel for an automobile can be manufactured by the following production process including the following steps. A first step is for forming a base layer of hard material by molding, for example. A second step is for applying an adhesive onto the base layer at least in a region corresponding to the breaking prearranging portion. A third step is for forming a covering layer on the base layer and bonding the covering layer with the base layer by the adhesive.

When shearing force is generated in the breaking prearranging portion of the internal mounting panel, in illustrated embodiments of the present invention, the shift of a breaking prearranging position can be restrained as much as possible. Therefore, the air bag cover can be substantially broken in the breaking prearranging position and the air bag can be developed.

In the illustrated embodiment, the base material layer is broken in the weak portion of the base material layer by pushing-up force of the air bag, and the surface layer is also simultaneously broken substantially in its just above position together with the base material layer. Dispersion in a breaking direction due to layer separation is restrained and predetermined desirable opening and tearing along the breaking prearranging line can be performed.

The internal mounting panel can be manufactured by only a molding process without requiring post-processing of the molding. In this molding, no complicated die is required and it is possible to cope with this molding by an insert molding die utilizing general reaction injection molding, etc.

If the cushion layer is provided under the skin, a panel excellent in both the external appearance and the feel can be set. At the operating time of the air bag, the breaking is not caused over-the breaking prearranging part, and is smoothly caused as supposed along this breaking prearranging part so that the internal mounting panel for a vehicle having high reliability can be obtained.

BRIEF DESCRIPTION OF THE DRAWINGS

FIG. 5 is a schematic view of the rear or back face of the interior panel of FIG. 4.

FIGS. 6A and 6B are schematic view for showing the structure of the back face surface of a surface layer of the interior panel of FIG. 4, in an example of a double hinged door (FIG. 6A) and an example of a single swing door (FIG. 6B) for deployment of the air bag.

DETAILED DESCRIPTION OF THE INVENTION

Figure 1:
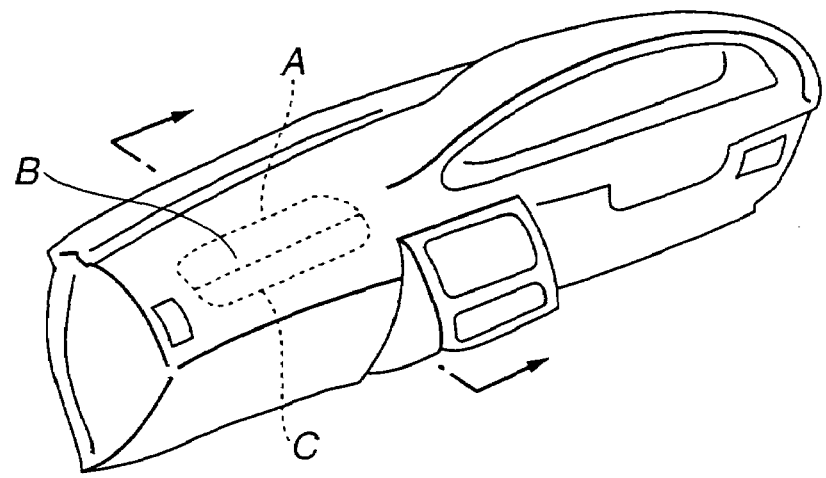
FIG. 1 is a perspective view showing an interior panel as an instrument panel according to a first embodiment of the present invention.

An interior panel or internal mounting panel according to a first embodiment of the present invention is constructed by a base material layer or base layer and a surface layer laminated on this base material layer.

The base material layer has a thickness in the range of 2.5 to 4.0 mm and is preferably constructed by a relatively hard material, e.g., PPC resin obtained by reinforcing polypropylene by talc, etc. Further, the surface layer laminated on this base material layer has a thickness in the range of 0.5 to 3.0 mm, and is preferably constructed by a soft material, e.g., polyurethane. Further, in this embodiment of the present invention, it is not necessary to provide a weak portion or weakened portion in the surface layer. However, when no weak portion is provided, the strength of the surface layer is preferably set to a strength level approximately equal to that of the surface layer in which the weak portion is produced in advance. In a more preferable concrete example, an un-foaming polyurethane resin of 70 kgf/cm or less in tensile load or micro foaming polyurethane resin of 0.8 or more in specific gravity is used. The invention is not limited to these materials. In short, it is sufficient to use materials so that the base material layer is harder and capable of holding required strength as the internal mounting panel, and the surface layer is softer, preferably elastic with an elastic property and adequate to improve the surface appearance and the feel.

Moreover, a cushion layer may be laminated between the base layer and the surface layer. The cushion layer preferably has a thickness of 5 to 8 mm, and is preferably molded by a reaction injection molding method using a foaming material, e.g., a polyurethane foaming material.

The surrounding or circumferential structure of a bottomed groove portion having a bottom for forming the breaking prearranging line or breakaway line is important in the internal mounting panel according to on aspect of the present invention.

Namely, the bottomed groove first contributes to the restriction of uneven or stepped rising at the time of breakage of the internal mounting panel due to the expansion of the air bag. Moreover, the bottom of the groove can prevent the molding material for the surface layer from entering the groove at the time of molding.

It is important that this groove portion is formed by forming the groove in the base layer from the air bag's side and to leave a groove bottom having a wall thickness preferably of 0.4 to 0.8 mm. It is also important that the surface layer is formed with a thick wall portion extending along the upper wall portion of this groove portion, and that portion of the surface layer has a raised portion preferably of 0.5 to 1.5 mm. In the surface layer, no substantial thin wall portion is particularly formed around the groove portion. The surface layer has no depression, no recessed portion, and no holes at least around the groove portion of the base layer.

Since the breakaway line or breaking prearranging line has such a structure, breaking can reach the thin and soft surface layer by a slight shift even when shearing force due to pushing-up of the air bag intended to be expanded out from below is applied at the operating time of the air bag device, and the breaking is therefore caused from the groove portion of the base material layer in a slanting direction or a transversal direction. Accordingly, the undesired shift of the breaking prearranging line can be restrained, and the internal mounting panel can be developed substantially along the breaking prearranging line correctly.

The shift of a breaking prearranging part caused when the panel is broken while the surface layer is separated or peeled can be also prevented by adhering the surface layer and the base material layer in the breaking prearranging portion with adhesive force sufficient to maintain the laminating state or bonded state at the breaking time.

In the surface layer, no substantial thin wall portion is particularly formed in the region near the groove portion. Accordingly, the surface external appearance of the internal mounting panel is not damaged and is well harmonized with the remaining part of the integrated instrument panel, and is visually integrated in the feel. Accordingly, no air bag expanding-out portion or air bag deployment door is recognized in the instrument panel.

A thin wall portion thinner than the surrounding regions may be formed in the surface layer in accordance with need within the range of the object of the present invention, i.e., as long as no surface side is visually influenced in the feel.

In the internal mounting panel according to one aspect of the present invention, it is important that the base material layer and the surface layer are bonded to each other with adhesive force sufficient to retain an integral laminate body against impact at the time of breakage of the air bag cover, at least in a region of the surface layer side part of the base material layer corresponding to the weak portion formed in the base material layer forming the breaking rearranging line of the internal mounting panel therein. Accordingly, in short, it is sufficient to adhere the surface layer to the base layer, with sufficient adhesive force causing no layer separation at the breaking time, and any adhering means may be used. However, in a preferable mode of the present invention, the breaking prearranging portion of the base material layer is coated in advance with an adhesive able to be chemically bonded to a molding material for forming the surface layer. An adhesive having an isocyanate group is particularly preferable as such an adhesive.

If the breaking prearranging portion of the base material layer is coated with such an adhesive and is inserted into a die and the polyurethane molding material is next injected, urethane bonding is generated between the adhesive and a polyol component within this polyurethane molding material so that the surface layer can be laminated with strong adhesive force. At least the breaking prearranging part of the base material layer may be coated with the adhesive, but the entire face of the base material layer coming in contact with the surface layer can be coated with the adhesive and can be also strongly adhered.

Further, known preprocess such as frame processing, plasma processing, etc. for raising the adhesive force can be also performed on the surface of the base material layer in accordance with necessity.

As already described, in short, as long as the surface layer can be adhered to the base material layer with sufficient adhesive force causing no layer separation at the breaking time, the air bag cover according to this aspect of the present invention can be also manufactured by a method for bonding a skin formed in advance, etc. without being limited to the reaction injection molding method.

In the internal mounting panel according to one aspect of the present invention corresponding to a second embodiment, the structure around the weak portion or weakened portion for forming the breaking prearranging line of the internal mounting panel is important.

Namely, the weak portion is formed in a continuous groove shape which has a bottom having a wall thickness preferably of 0.3 to 2.5 mm, and which is formed from the air bag device's side, in the base material layer. A discontinuous concave or depressed portion is formed on the cushion layer's side of the above skin or surface layer, in a region corresponding to this weak or weakened part. As mentioned above, the thickness of the skin or surface layer in this concave portion is preferably set to about 0.3 mm. The concave portion may be formed in a groove shape, but is preferably in the form of hole portions spaced and arranged at intervals. Preferably, each hole portion is a circular hole having a diameter of 0.3 to 1.0 mm φ and the hole portions are arranged at regular intervals of 0.5 to 1.5 mm.

In a crossing part at which two prearranging lines intersects with each other, the concave portion is preferably in the form of a continuous form at the crossing part so as to attain smoothly breakage of the breaking prearranging portion.

In this embodiment of the present invention, the above weak or weakened portion is also formed in the rear face of the skin so as to correspond to the weak or weakened portion constructed by the continuous groove of the base material layer. Accordingly, the smooth breaking can be achieved along the breaking line supposed at the operating time of the air bag device. A convex shape portion or raised portion is preferably formed at the side of the above concave portion so as to further secure this smooth breaking so that the fear is further eliminated that the soft and thin skin small in strength is broken beyond the breaking prearranging line formed by the above concave portion and is also broken until an area outside the prearranging portion. Accordingly, the convex shape portion may be formed on one side or both sides of the concave portion of the skin along all side faces of this concave portion of the skin. However, the convex shape portion may be also formed selectively in an area having a fear that a shift not prearranged is further caused in the breaking part, e.g., formed in the crossing portion (a bent portion) of the breaking prearranging line, etc.

Since the breaking prearranging portion is set to have such a structure, the air bag can be smoothly developed without opening and tearing beyond the breaking prearranging portion by pushing-up of the air bag intended to be expanded out from below at the operating time of the air bag device even in the panel of a three-layer structure having the cushion layer in an intermediate layer and including the thin skin small in strength.

The above convex shape portion can also contribute to the improvement of the surface external appearance of the skin. Namely, the shift to an area not supposed at the breaking time can be prevented. As a result, a general portion except for the concave portion can be further thinly constructed so that the external appearance and the feel can be finished in a softer feeling.

This breaking prearranging line can be arranged in a U-shape in the case of an open side door or single swing door (as shown in FIG. 6B) and the shape of an H-type in the case of a double hinged door (as shown in FIG. 6A) in accordance with the shape of a door portion of the internal mounting panel.

An adhesive for performing the adhesion with adhesive strength sufficient to maintain the laminating or bonded state at the breaking time of the air bag cover can be applied as a breaking inducing means or break guide means in combination with a rising portion or a raised portion. However, the rising or raised portion is not necessarily indispensable. Accordingly, only an adhesive not combined with the rising portion and able to maintain the laminating state and induce breaking advancement of the groove having the bottom in the upward direction can be also applied.

The internal mounting panel of the present invention is suitable for the integration of the instrument panel, but is not limited to this integration. The present invention can be applied to various kinds of internal mounting panels or interior panels in places in which the air bag is expanded out from a part requiring an integral shape having no joint of the external appearance.

EMBODIMENT 1

The embodiments according to the present invention will next be explained on the basis of the drawings.

Figure 2:
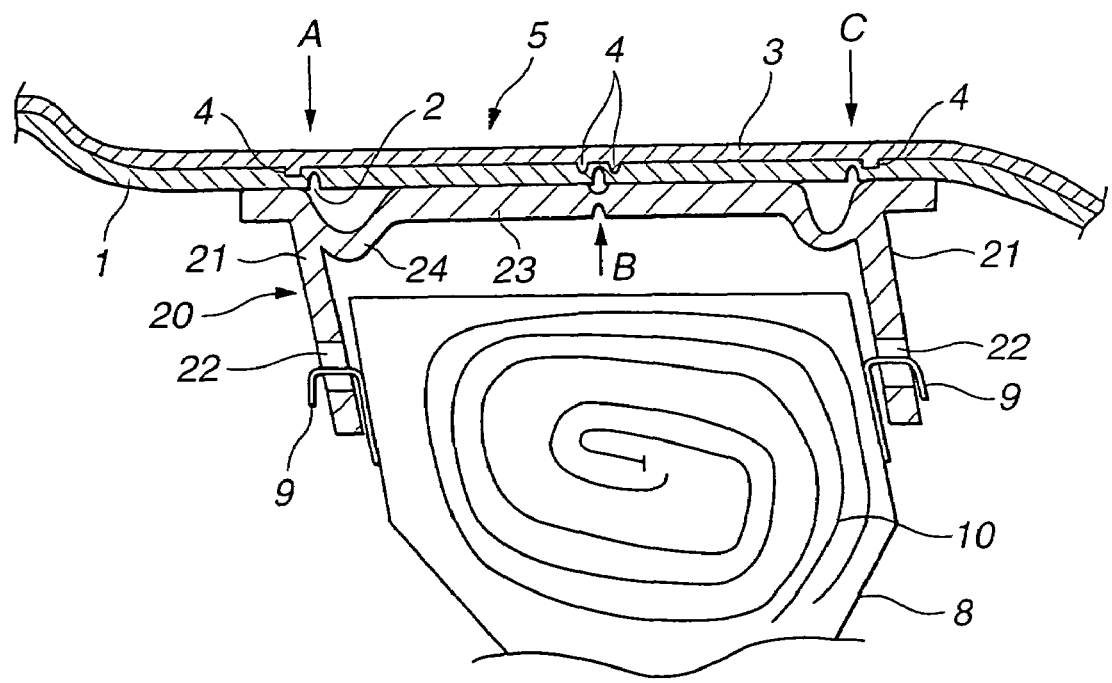
FIG. 2 is a sectional view taken along a line shown by arrows in FIG. 1.

FIG. 1 is a perspective view of an interior panel which, in this example, an instrument panel including an air bag cover integrally molded. In FIG. 1, reference numeral B designates a breaking prearranging line or breakaway line formed in the back surface of the instrument panel, and reference numerals A and C designate hinge portions serving as a hinge of an opened air bag deployment door. FIG. 2 is a sectional view of a portion shown by arrows in FIG. 1. FIG. 2 shows the air bag cover in which an inner member 20 manufactured by TPO resin and including a wall portion 21 formed by boring an engaging hole portion 22 engaged with a hook 9 of a reaction can 8 fixed to an unillustrated steering member is vibrationally welded, etc. and is stuck to the back surface of the base material layer 1.

A door portion 5 is pushed up and tear opened by the expansion of the air bag 10 so that the air bag 10 is developed within the automobile passenger compartment through the opening formed by the door portion 5. A door support portion 23 is connected to the wall portion 21 through a hinge 24, and is located so as to be overlapped with the hinge portions A, C at the developing time of the air bag 10, and supports the door portion 5. The air bag cover of this example is a part of a so-called seamless instrument panel which is a panel for covering the upper face of the instrument panel approximately over its entire width. The air bag cover has a simple external appearance in which no mounting position of an air bag module is easily recognized and the external appearance is well harmonized with the circumference.

Figure 3:
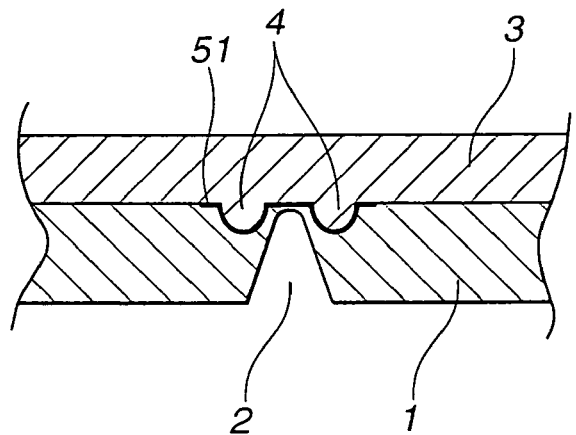
FIG. 3 is a sectional view showing a bottomed groove in a base layer and two raised portions in a surface layer of the interior panel of FIG. 2.

In FIGS. 2 and 3, reference numeral 1 designates a base material layer injection-molded in advance and the base material layer 1 is made of polypropylene resin raised in strength by adding talc. Reference numeral 2 designates a groove portion or bottomed groove having a bottom as a weak portion or weakened portion formed in the base material layer, and a part corresponding to this groove portion is coated with a polyurethane system adhesive having a free isocyanate group. An adhesive layer (51) of this adhesive has a width of 40 mm, i.e., 20 mm in width on each of the left and right sides with a center at a position corresponding to the center of the weak portion 2 having the bottom as shown in FIG. 3. The adhesive layer (51) extends slightly beyond each of left and right raised portions or rising portions 4, as shown in FIG. 3.

Reference numeral 3 designates a surface layer made of un-foaming polyurethane resin, in this example. This example uses, as the polyurethane, a molding material constructed by isocyanate and polyol of 2000 to 6000 in average molecular weight. The isocyanate is formed by using MDI constructed by mixing e.g., polyol modified MDI and non-modified MDI in a weight ratio of 1:1. The surface layer is laminated and molded by the reaction injection molding on the above inserted base material layer. The polyurethane skin or surface layer having a tensile strength (70 kgf/cm or less) suitable for the developing time of the air bag is obtained by the above processing method. Furthermore, the urethane skin is strongly adhered to the adhesive so as not to cause the layer separation by the urethane bonding between the polyurethane skin and the above adhesive even at the breaking time.

Reference numeral 4 designates a surface layer rising portion or raised portion. The rising or raised portion 4 projects downward as viewed in FIG. 2 from the back surface of the surface layer 3, into the base layer 1. The shape of the surface layer rising portion 4 may be set to an approximately semi-circular shape as shown by a portion B of FIG. 2, and may be also set to a rectangular rib shape as shown by a portion A of FIG. 2. These shapes may be formed on one side (e.g., portion A) of the groove portion or bottomed groove 2, and may be also formed on both sides (e.g., portion B). In the example of FIG. 2, at each of the terminal portions A and C, the raised portion 4 is formed only on an outer side of the groove portion 2. At the middle portion B, the raised portions 4 are formed on both sides of the groove portion 2, as shown in FIG. 2. Further, the surface rising portion 4 may be continuously formed along the groove portion 2, and may be also intermittently spaced and formed at a suitable interval.

An effect for increasing an adhesive area can be also shown by forming such a rising or raised portion so that the adhesive force is also strengthened. Even when the air bag cover rises unevenly, the position shift of a breaking part can be restrained as much as possible, and the air bag cover can be substantially opened and torn along the breaking prearranging line. In this case, the weak portion of the base material layer can be projected and the surface layer can be also thinly set in the construction as shown in FIG. 3 so as to further obtain predetermined desirable breaking characteristics.

The rising portion 4 of the surface layer may be continuously arranged along the weak portion and may be also intermittently spaced arranged at a suitable interval. Further, the surface layer rising portion 4 can be arranged on both sides of the weak portion and can be also arranged on only one side of the weak portion.

EMBODIMENT 2

A second embodiment according to the present invention will next be explained on the basis of the drawings.

Figure 4:
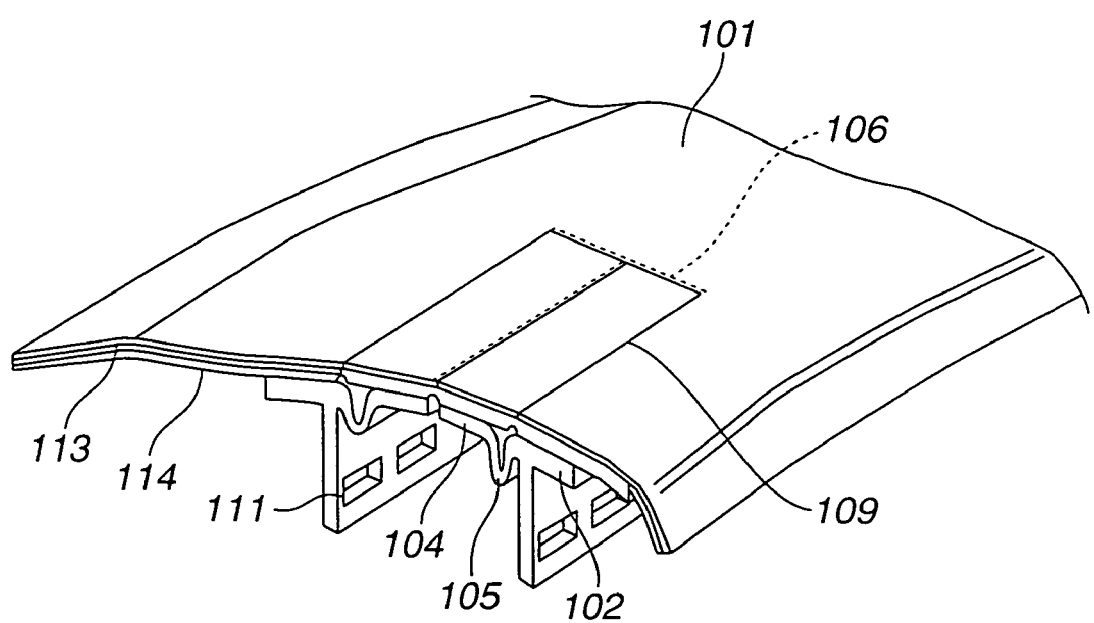
FIG. 4 is a perspective view of an interior panel for a motor vehicle according to a second embodiment.
Figure 7:
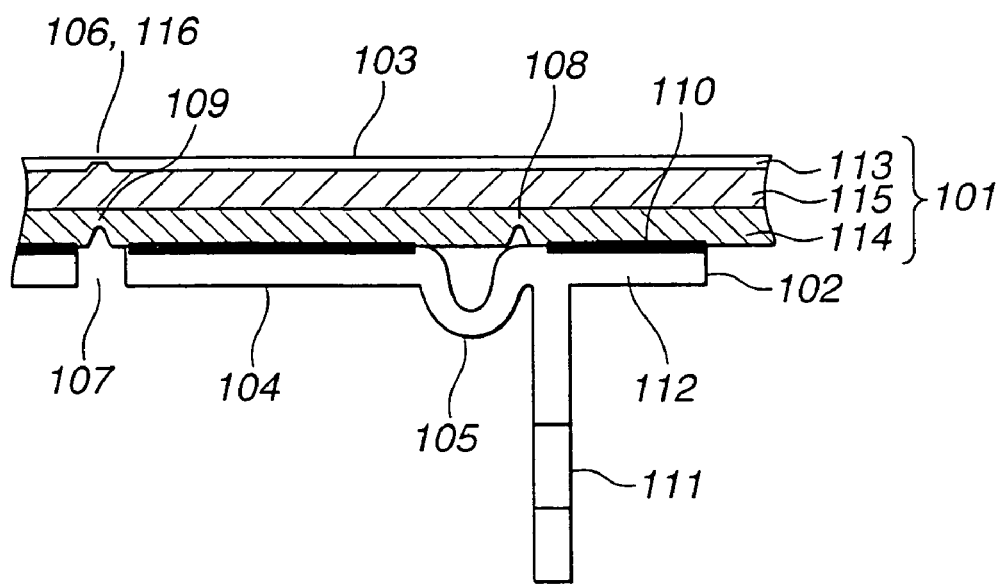
FIG. 7 is a schematic sectional view taken along a line A-A in FIG. 5
Figure 8:
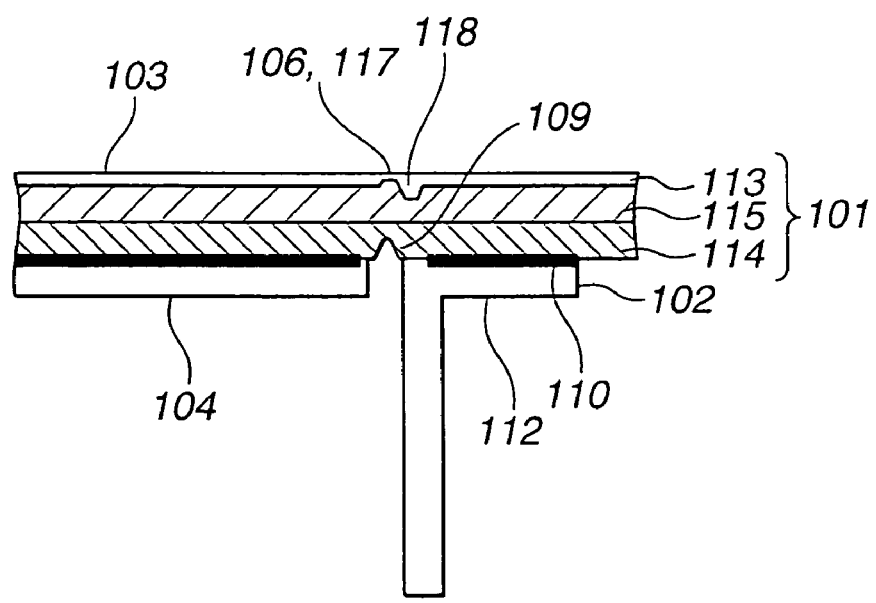
FIG. 8 is a schematic sectional view taken along a line B-B in FIG. 5.
Figure 9:
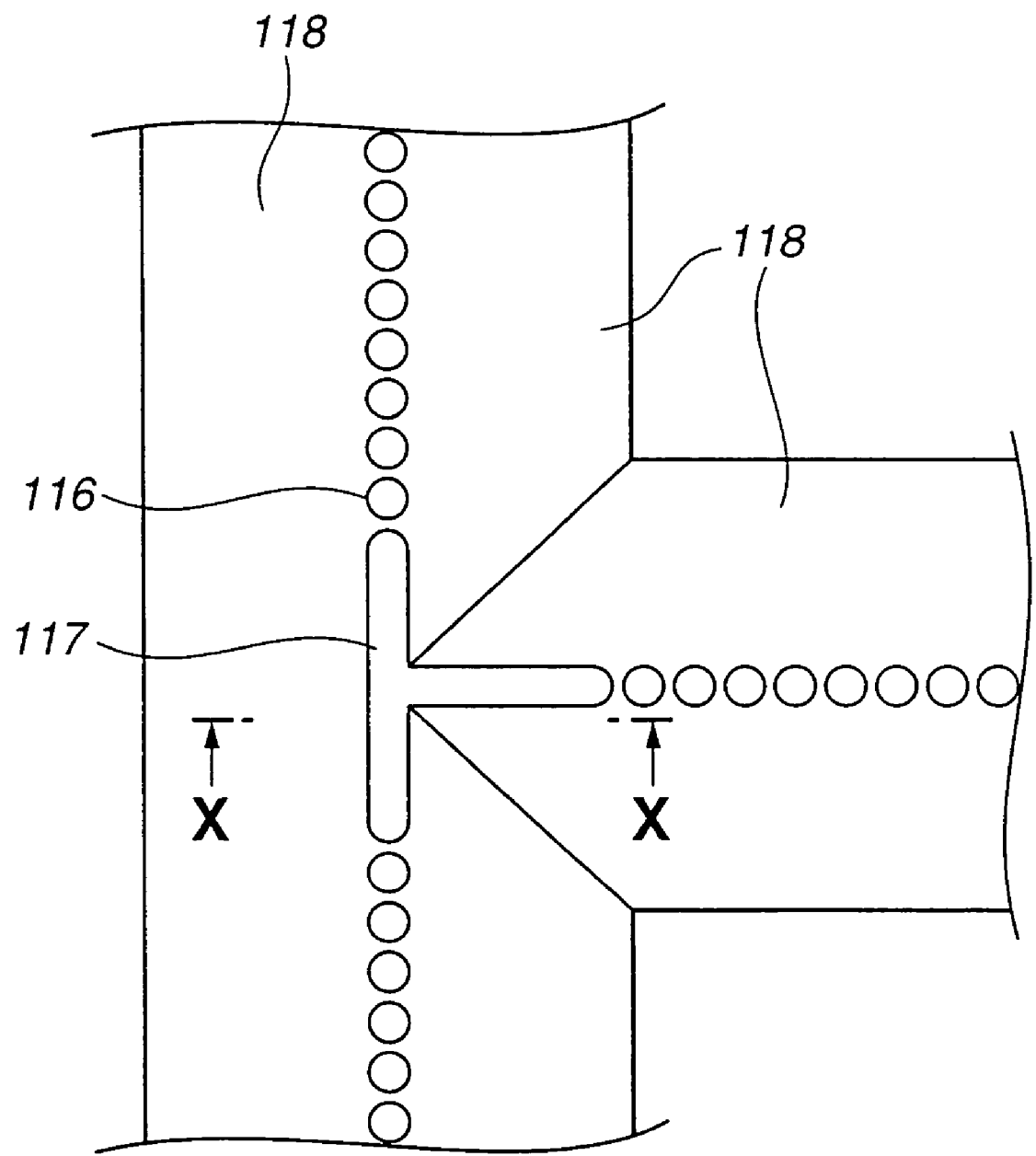
FIG. 9 is a plan view for illustrating a depression formed in the back surface of the surface layer of the interior panel of FIG. 4.
Figure 10:
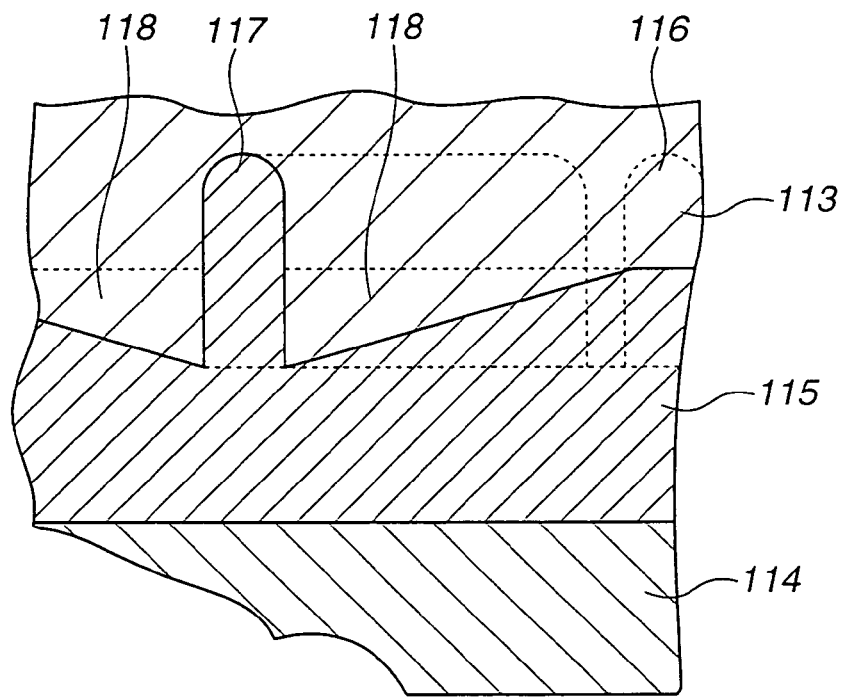
FIG. 10 is a schematic sectional view of the r depression in an X-X line in FIG. 9.
Figure 11:
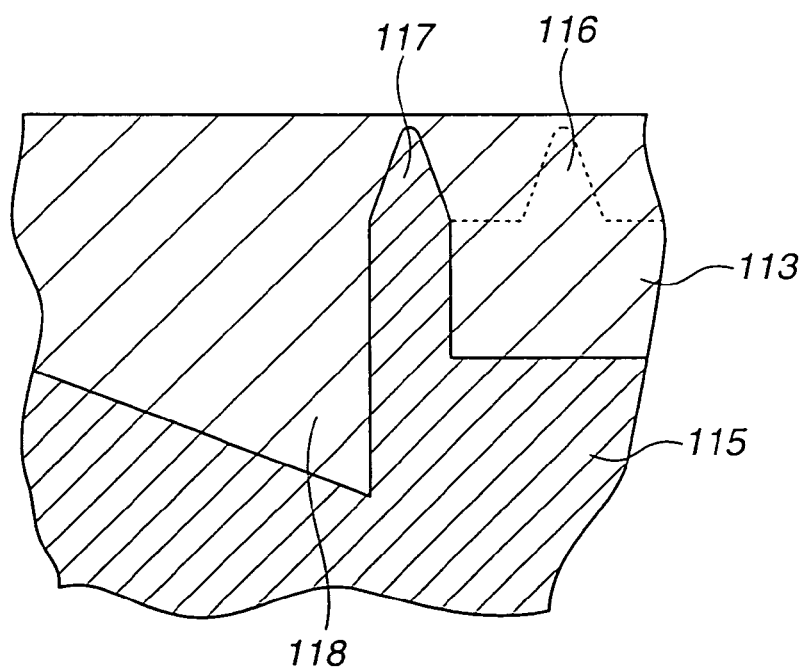
FIG. 11 is a schematic sectional view similar to FIG. 10, but showing a modified example in the position corresponding to that in FIG. 9.

FIG. 4 is a perspective view of an internal mounting panel or interior panel for an automobile with which an air bag device is integrated, according to the second embodiment. FIG. 5 is an explanatory view of the rear or back face of the interior panel of FIG. 4. FIG. 6 explains the structure of the rear or back face of a skin layer or surface layer of the interior panel of FIG. 4, and intends to show a double hinged door (FIG. 6A on the left side) and an open side or single swing door (FIG. 6B on the right side) for deployment of the air bag. FIG. 7 is a sectional explanatory view taken along line A-A within FIG. 5. FIG. 8 is a sectional explanatory view taken along line B-B within FIG. 5. FIG. 9 is a plan view for explaining a concave portion or depression (a breaking prearranging weak portion) formed in the rear or back surface of the surface layer. FIG. 10 is a sectional explanatory view of the concave or depressed portion in an X-X line part within FIG. 9. FIG. 11 is an explanatory view showing a modified example in a position corresponding to that in FIG. 9.

In these figures, reference numerals 101, 102 and 103 respectively designate an internal mounting panel main body or interior panel for an automobile, a soft resin inner member (a support member of a door portion), and the door portion. Reference numerals 104, 105 and 106 respectively designate a door reinforcing portion, a hinge portion and a skin breaking prearranging line or surface layer breakaway line. Reference numerals 107, 108 and 109 respectively designate a clearance or hollow portion, a thin wall hinge portion and a weak or weakened portion of a base material layer. Reference numerals 110, 111 and 112 respectively designate a joining portion (or adhesive layer), a retainer fixing hole and an outer circumferential edge portion. Reference numerals 113, 114 and 115 respectively designate a soft polyurethane skin or surface layer, a hard resin base material layer or base layer and a cushion layer. Reference numerals 116, 117 and 118 respectively designate a discontinuous concave or depressed portion, a continuous concave or depressed portion (or (T-shaped) groove) and a convex shape or projected portion. The weakened portion 109 of the base layer includes a first segment extending in a line and a second segment extending to an intermediate point of the first segment so as to form a T-shaped joint portion, which is shown in plan view in FIG. 5 and cross-sectional views in FIGS. 7 and 8. The depressed portions 116 may also include a T-shaped groove which is formed just above the T-shaped joint portion of the weakened portion 109 (see FIGS. 7 and 8).

In this embodiment, the depression (116, 117) shown in FIG. 9 includes the discontinuous depressed portion including one or more series of hole portions or depressed regions 116 in an entire area constituting the breaking prearranging line. Moreover, the depression (116, 117) shown in the example of FIG. 9 further includes the continuous depressed portion including a continuous groove (or T-shaped groove) formed in a crossing part of the breaking prearranging lines. Each of the hole portions or depressed region 116 of this example is set to 0.5 mmφ and the interval of the hole portions 116 is set to 0.3 mm.

In manufacture of the interior panel shown in FIG. 4, the skin or surface layer is first molded by the injection molding or reaction injection molding method using a die corresponding to the structure of the breaking prearranging portion of the skin.

The skin or surface layer of this example has a very thin wall portion as a polyurethane material. Accordingly, it is preferable to use the polyurethane material having high fluidity, e.g., 500 to 1000 centipoises in viscosity at a filling time. Further, a molding material as small as possible in contraction coefficient after the molding, e.g., a molding material of about 3 to 8 ten-thousandths ($3/10000 \sim 8/10000$) in contraction coefficient is preferable. Further, the material of the skin or surface layer preferably has un-foaming or micro foaming characteristics of 0.8 or more in specific gravity, and preferably the tensile strength of the skin or surface layer is 70 kgf/cm or less, for smoothly opening and tearing of the skin.

As mentioned above, the base material layer is manufactured by the injection molding from polypropylene filled with e.g., talc. The weak or weakened portion of the base material layer may be formed at the time of molding, or alternatively may be formed by cutting and removing this base layer part after the molding. Next, the surface layer and the base material layer are inserted into the die and the polyurethane foaming material is filled between these members by the reaction injection molding method so that the internal mounting panel for an automobile shown in FIG. 4 can be molded.

The soft inner member for storing the air bag device shown within FIG. 4 is joined to the panel main body by vibrational welding using a rib for welding in its door reinforcing portion and its outer circumferential edge portion.

The cushion layer is extended inside the above concave portion or depression of the soft and thin skin or surface layer small in strength, and the depression is divided into separate portions with no continuous groove entirely formed. Accordingly, there is no fear that the skin is damaged by this concave portion or the depression at the normal time. Further, the existence of this concave portion is not sensed by a passenger even when the passenger comes in direct contact with the concave portion. In addition, the above cushion layer is extended to the inside of the concave portion of the skin. Therefore, no panel surface is visually influenced by the concave portion formed in the skin. Accordingly, it is possible to visually obtain an excellent surface external appearance harmonized with a general portion of the internal mounting panel in the touch.

This application is based on Japanese patent application Nos. 2003-340994 (filed in Japan on Sep. 30, 2003), 2003-340397 (filed in Japan on Sep. 30, 2003) and 2003-340398

(filed in Japan on Sep. 30, 2003). The entire contents of these Japanese Patent Applications are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An interior panel for covering an air bag module of a vehicle, comprising:
   a base layer of hard resin, formed with a breakaway portion to form a deployment door for the air bag module; and
   a surface layer of soft resin overlying the base layer, and forming an interior surface,
   wherein the base layer includes a first surface on which the surface layer is formed, and a second surface opposite to the first surface of the base layer; the surface layer includes a first surface forming the interior surface and a second surface facing toward the base layer; and the breakaway portion is formed in the second surface of the base layer and designed to break in case of deployment of an air bag of the air bag module,
   wherein the breakaway portion of the base layer includes a bottomed groove formed in the second surface of the base layer and extends in the second surface of the base layer; and the surface layer includes a raised portion extending away from the second surface of said surface layer and alongside the bottomed groove of the base layer, the raised portion being formed on the second surface of the surface layer, and
   wherein the first surface of said surface layer is formed continuously without interruptions over an area that overlays the breakaway portion.

2. The interior panel as claimed in claim 1, wherein the surface layer includes two of the raised portions extending along and near the bottomed groove of the base layer, respectively, on opposite sides of the bottomed groove.

3. The interior panel as claimed in claim 1, wherein the raised portion is a projection of the surface layer projecting from the second surface of the surface layer into the base layer.

4. The interior panel as claimed in claim 3, wherein the raised portion extends into the base layer from the first surface of the base layer toward the second surface of the base layer beyond a bottom of the bottomed groove, so that the bottomed groove and the raised portion are overlapped in a widthwise direction of the interior panel.

5. The interior panel as claimed in claim 1, further comprising an adhesive layer extending along the breakaway portion of the base layer and bonding the surface layer and the base layer with an adhesive force for retaining a bonded state between the base layer and the surface layer even when the breakaway portion is broken by deployment of the air bag.

6. The interior panel as claimed in claim 5, wherein the surface layer has a tensile strength equal to or smaller than 70 kgf/cm, and the tensile strength of the surface layer is smaller than the adhesive force between the base layer and surface layer.

7. The interior panel as claimed in claim 5, wherein the breakaway portion of the base layer includes a weakened portion formed in the second surface of the base layer and extends in the second surface of the base layer; the adhesive layer is formed, in the shape of a band, on the first surface of the base layer; and the adhesive layer extends along the weakened portion so as to cover the weakened portion between two non-adhesive regions so that the adhesive force between the base layer and the surface layer is increased in the adhesive layer as compared to the non-adhesive regions.

8. The interior panel as claimed in claim 5, wherein the adhesive layer is bonded with the surface layer by urethane bond.

9. The interior panel as claimed in claim 1, wherein the surface layer is made of polyurethane by reaction injection molding, and the base layer is made of polyolefin material.

10. The interior panel as claimed in claim 1, wherein the interior panel is an instrument panel for the vehicle; the deployment door is an integral part of the instrument panel; the surface layer has no depressions in the second surface; and the base layer has no projections in the first surface.

* * * * *